United States Patent [19]

Suzuki et al.

[11] Patent Number: 4,993,654
[45] Date of Patent: Feb. 19, 1991

[54] METHOD OF WINDING FILM ON A SPOOL AND LOADING THE SPOOL WITH THE FILM INTO A MAGAZINE, AND A SYSTEM FOR CARRYING OUT THE METHOD

[75] Inventors: Chiaki Suzuki; Shigehisa Shimizu, both of Kanagawa, Japan

[73] Assignee: Fuji Photo Film Co., Ltd., Kanagawa, Japan

[21] Appl. No.: 441,576

[22] Filed: Nov. 27, 1989

Related U.S. Application Data

[62] Division of Ser. No. 351,236, May 15, 1989, Pat. No. 4,947,536.

[30] Foreign Application Priority Data

May 13, 1988 [JP] Japan .................. 63-116404

[51] Int. Cl.⁵ .............................................. B65H 18/10
[52] U.S. Cl. .............................................. 242/67.10 R
[58] Field of Search ............... 242/67.1 R, 67.2, 67.4, 242/56 R, 56 A, 55, 58.6, 79, 81

[56] References Cited

U.S. PATENT DOCUMENTS

| | | |
|---|---|---|
| 2,940,232 | 6/1960 | Wallace et al. |
| 3,518,746 | 7/1970 | Hoover .................................. 29/806 |
| 3,586,258 | 6/1971 | Horlezeder ........................... 242/197 |
| 3,930,296 | 1/1976 | Hoover .................................. 29/430 |
| 4,115,913 | 9/1978 | Moriya et al. ........................ 29/450 |
| 4,160,528 | 7/1979 | Malone et al. ..................... 242/56 R |
| 4,180,905 | 1/1980 | Klinkhammer et al. .............. 29/786 |
| 4,261,786 | 4/1981 | Martin et al. ........................ 242/55 |
| 4,544,110 | 10/1985 | Nagel et al. .................... 242/67.1 R |
| 4,564,999 | 1/1986 | Uchiyama et al. ................... 29/806 |
| 4,575,018 | 3/1986 | Ichikawa ............................... 242/66 |
| 4,614,019 | 9/1986 | Shimizu et al. ..................... 29/450 |
| 4,730,781 | 3/1988 | Richter et al. ................... 242/79 X |
| 4,862,579 | 9/1989 | Takahashi et al. ................. 156/552 |
| 4,891,089 | 1/1990 | Takahashi et al. ................. 156/552 |
| 4,928,897 | 5/1990 | Satou et al. .......................... 242/55 |

FOREIGN PATENT DOCUMENTS

52-115215  9/1977  Japan .

*Primary Examiner*—John M. Jillions
*Attorney, Agent, or Firm*—Sughrue, Mion, Zinn, Macpeak & Seas

[57] ABSTRACT

A spool around which a roll film is to be wound is carried by a pallet having a spool holding shaft which holds the spool and rotates the spool under a force transmitted thereto from outside the pallet and a pair of film pinch arms which pinch the outer end portion of the roll film wound around the spool and is moved from station to station in a film cassette assembly line.

2 Claims, 4 Drawing Sheets

METHOD OF WINDING FILM ON A SPOOL AND LOADING THE SPOOL WITH THE FILM INTO A MAGAZINE, AND A SYSTEM FOR CARRYING OUT THE METHOD

This is a divisional of application No. 07/351,236 filed May 15, 1989, now U.S. Pat. No. 4,947,536.

BACKGROUND OF THE INVENTION

1. Field of the Invention

This invention relates to a method of winding a photographic roll film such as 16 mm film or 35 mm film around a spool and loading the roll film-spool assembly into a film magazine, and a system for carrying out the method.

2. Description of the Prior Art

As disclosed, for instance, in Japanese Unexamined Patent Publication No. 52(1977)-115215, there has been widely known a system in which a roll film is wound around a spool on a horizontal or vertical index table which holds one or more spools and intermittently rotates, and the spool with the roll film is picked up and sent to a magazine assembly station, where the spool with the roll film is inserted in a film magazine.

In the known system, the spool with the roll film must be delivered from one pickup arm to another pickup arm a plurality of times, and since the spool carrying thereon a roll film is hard to stably hold, trouble is apt to occur during delivery of the spool, which can cause various troubles such as interruption of the assembly line.

Further, the step of winding the roll film around the spool takes a much longer time than the other steps such as the step of inserting the spool with the roll film into a film magazine, or the step of capping the film magazine. Accordingly, in the known system in which the spool is provided with a roll film and sent to the magazine assembly station one by one, the time required to assemble each film magazine is governed by the time required to wind the roll film around the spool. This is not preferable from the viewpoint of increase in the productivity.

SUMMARY OF THE INVENTION

In view of the foregoing observations and description, the primary object of the present invention is to provide a method of winding a photographic roll film around a spool and loading the roll film-spool assembly into a film magazine in which troubles which accompanies delivery of the roll film-spool assembly can be prevented.

Another object of the present invention is to provide a method of winding a photographic roll film around a spool and loading the roll film-spool assembly into a film magazine in which the effective time required to assemble each film cassette can be shortened.

Still another object of the present invention is to provide a system for carrying out the method.

In accordance with the present invention, a spool around which a roll film is to be wound is carried by a pallet having a spool holding shaft which holds the spool and rotates the spool under a force transmitted to the spool holding shaft from outside the pallet and a film pinch means which pinches the outer end portion (the leader portion) of the roll film wound around the spool and is moved from station to station in a film cassette assembly line.

In accordance with a first aspect of the present invention, there is provided a method of winding a photographic roll film around a spool and loading the spool with the film into a film magazine comprising the steps of preparing a film winding pallet which has a spool holding shaft which holds a spool and rotates the spool about its longitudinal axis under a force transmitted to the spool holding shaft from outside the film winding pallet, and a film pinch means which is opened and closed under a force transmitted thereto from outside the film winding pallet and pinches the leader portion of a roll film when it is closed, positioning the film winding pallet with a spool held on the spool holding shaft in a predetermined film winding station, connecting the end of a roll film opposite to said leader portion to the spool, thereafter transmitting a rotational force to the spool holding shaft from outside the film winding pallet so that the spool is rotated and the roll film is wound around the spool with the leader portion kept unrolled, transmitting a force to the film pinch means from outside the film winding pallet so that the film pinch means is closed and pinches the leader portion of the roll film, moving the film winding pallet in the longitudinal direction of the spool, thereby loading the spool with the roll film into a magazine barrel, transmitting a force to the film pinch means from outside the film winding pallet so that film pinch means is opened and releases the leader portion of the roll film, causing the spool holding shaft to release the spool, sending to a spool feeding station the film winding pallet which has thus delivered the spool with the roll film to a film magazine, causing the spool holding shaft of the film winding pallet to hold another spool, and returning the film winding pallet with the another spool to said film winding station.

In accordance with a second aspect of the present invention, there is provided a method of winding a photographic roll film around a spool and loading the spool with the film into a film magazine which is similar to the method in accordance with the first aspect of the present invention but characterized by steps of positioning the film winding pallets to the number of n which is not smaller than 2, each holding a spool on the spool holding shaft, in a predetermined film winding station, and thereafter simultaneously transmitting rotational forces to the spool holding shafts on the respective film winding pallets from outside the film winding pallets so that the spools are rotated and the roll films are wound around the spools with the leader portions kept unrolled.

In this method, the film winding pallets which have been provided with the roll films are sent to the film magazine assembly station one by one and to the spool feeding station also one by one.

Each of the steps of loading each spool with the roll film into a magazine barrel and feeding another spool to the spool holding shaft of each film winding pallet is performed within one n-th of the time interval between the time the step of winding the roll films is began in one cycle and the time the step of winding the roll films is began in the next cycle.

In accordance with a third aspect of the present invention, there is provided a system for winding a photographic roll film around a spool and loading the spool with the film into a film magazine comprising a plurality of film winding pallets, each having a spool holding shaft which holds a spool and rotates the spool about its longitudinal axis under a force transmitted to the spool holding shaft from outside the film winding pallet and a film pinch means which is opened and closed under a force transmitted thereto from outside the film winding pallet and pinches the leader portion of a roll film when it is closed, a first indexing means having a plurality of guide members which are disposed about a rotational axis at regular angular intervals and at equidistance from the rotational axis, each guide member being adapted to support the film winding pallets to the number of n (n being not smaller than 2) so that the spool holding shafts of the respective film winding pallets are in alignment with each other in a direction parallel to the rotational axis and the film winding pallets are movable back and forth in the direction of the spool holding shaft, a second indexing means having a plurality of guide members which are disposed about a rotational axis at regular angular intervals and at equidistance from the rotational axis, the rotational axis of the second indexing means being in alignment with the rotational axis of the first indexing means and each guide member of the second indexing means being in alignment with one of the guide members of the first indexing means, a first indexing means driving means which intermittently rotates the first indexing means at intervals of a first predetermined time T1 by an angle equal to the angular interval between adjacent two guide members of the first indexing means, a second indexing means driving means which intermittently rotates the second indexing means at intervals of a second predetermined time T2 by an angle equal to the angular interval between adjacent two guide members of the second indexing means and stops the same in a position where each of the guide members of the second indexing means is in alignment with one of the guide members of the first indexing means, the second predetermined time T2 being equal to one n-th of the first predetermined time T1, a means for connecting the end of a roll film opposite to said leader portion to the spool held by each of the n film winding pallets on the guide rail of the first indexing means which is positioned in a predetermined film winding station, a winding driving means which transmits rotational forces simultaneously to the spool holding shafts held by the respective film winding pallets in the predetermined film winding station from outside the film winding pallets so that the spools are rotated and the roll films are wound around the spools with the leader portions kept unrolled, a film pinch means driving means which transmits forces to the film pinch means of the respective film winding pallets from outside the film winding pallets after the roll films are wound around the spools so that the film pinch means are closed and pinch the leader portions of the roll films, a spool-film assembly feeding means which, when the first indexing means is rotated and the guide member on which the n film winding pallets holding thereon the spools provided with the roll films are supported is stopped at a predetermined spool-film assembly feeding station, moves the each film winding pallet along the guide member in the direction of the free end of the spool, delivers it to one of the guide members of the second indexing means, thereby loading each spool with the roll film into a film magazine barrel plate which has been provided there, transmits a force to the film pinch means from outside the film winding pallet so that film pinch means is opened and releases the leader portion of the roll film, and causes the spool holding shaft to release the spool, the spool-film assembly feeding means being arranged to perform these operations within the second predetermined time T2 per one film winding pallet, a spool feeding means which, when the second indexing means is rotated and the guide member on which the film winding pallet which has released the spool is supported is stopped at a predetermined spool feeding station, feeds another spool to the spool holding shaft of the film winding pallet and causes the spool holding shaft to hold the spool, the spool feeding means being arranged to perform these operations within the second predetermined time T2 per one film winding pallet, and a pallet returning means which, when the second indexing means is rotated and the guide member on which the film winding pallet which has been provided with another spool is supported is stopped at a predetermined pallet returning station, moves the pallet from the guide member of the second indexing means to the guide member of the first indexing means and positions n film winding pallets in predetermined positions on the guide member, the spool feeding means being arranged to perform the operation of moving the pallet to the guide member of the first indexing means within the second predetermined time T2 per one film winding pallet.

In accordance with a fourth aspect of the present invention, there is provided a film winding pallet comprising a spool holding shaft which holds a spool and rotates the spool about its longitudinal axis under a force transmitted thereto from outside the film winding pallet, a film pinch means which is opened and closed under a force transmitted thereto from outside the film winding pallet and pinches the leader portion of a roll film wound around the spool when it is closed, a brake means which brakes the spool holding means and release the same as desired and an engagement portion which is adapted to be engaged with an external guide member to be slidable along the external guide member in a direction parallel to the spool holding shaft.

BRIEF DESCRIPTION OF THE DRAWINGS

FIG. 8 is a perspective view showing the film winding means employed in the system shown in FIG. 1.

DESCRIPTION OF THE PREFERRED EMBODIMENT

Figure 1:
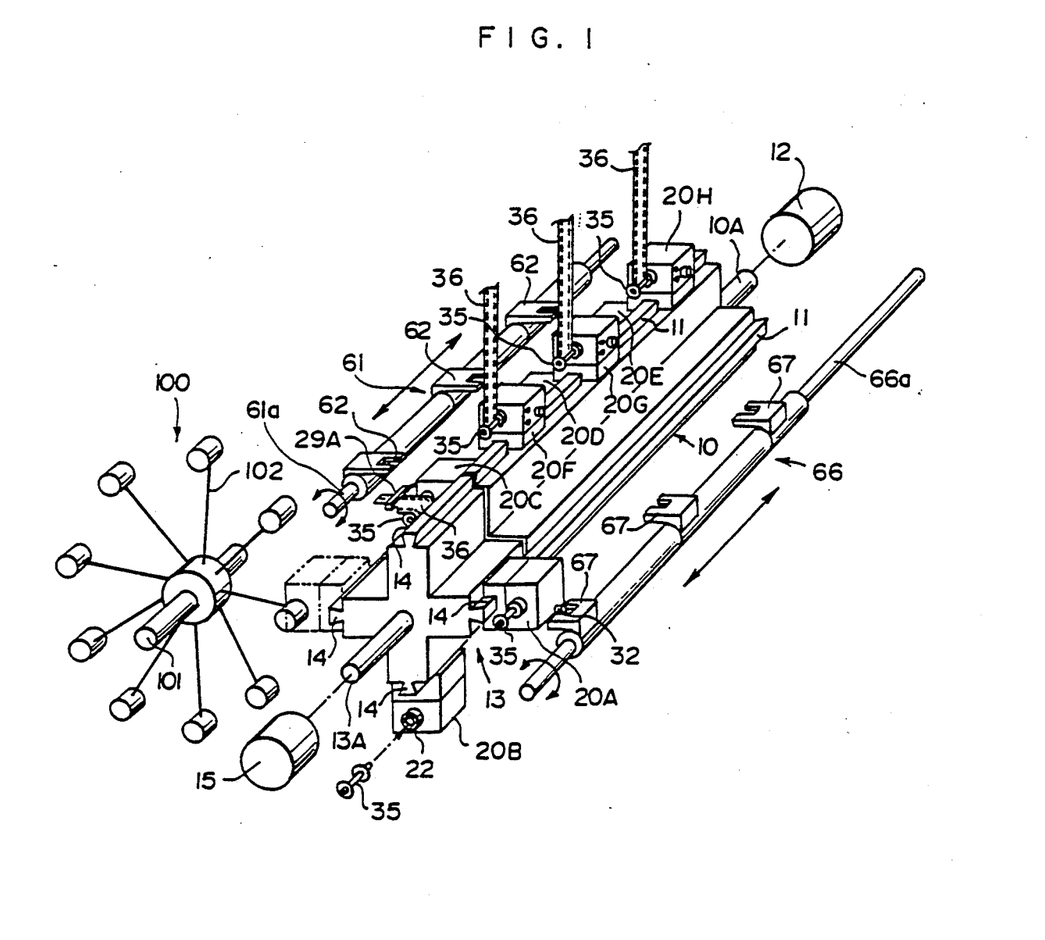
FIG. 1 is a perspective view showing a main part of a system for winding a roll film around a spool and loading the roll film-spool assembly into a film magazine.

In FIG. 1, a first indexing means 10 is rotatable about a shaft 10A, and is provided with four guide rails 11 which are arranged at intervals of 90° about the shaft 10A and extend in parallel to the shaft 10A. The shaft 10A is connected to a first indexer driving means 12 and is intermittently rotated in the counterclockwise direction by 90° at intervals of a predetermined time T1. A second indexing means 13 is provided on the side of the first indexing means 10 opposite to the first indexer driving means 12 and is rotatable about a shaft 13A which is coaxial with the shaft 10A. The second indexing means 13 is provided with four guide rails 14 each of which is the same as the guide rail 11 of the first indexing means 10 in cross-sectional shape and adapted to be in alignment with one of the guide rails 11. The shaft 13A of the second indexing means 13 is connected to a second indexer driving means 15 and is intermittently rotated in the counterclockwise direction by 90° at intervals of a predetermined time T2 which is one third of the predetermined time T1. That is, the first indexing means 10 is rotated once every time the second indexing means 13 is rotated three times, or the first indexing means 10 is rotated by 90° every time the second indexing means 13 is rotated by 270°.

Figure 2:
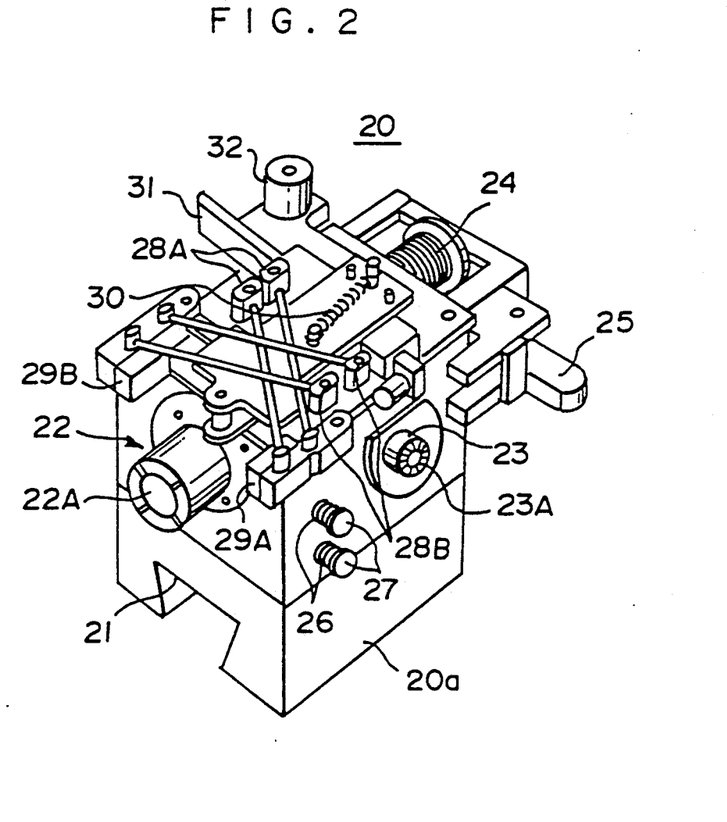
FIG. 2 is a perspective view showing the film winding pallet employed in the system shown in FIG. 1.
Figure 3:
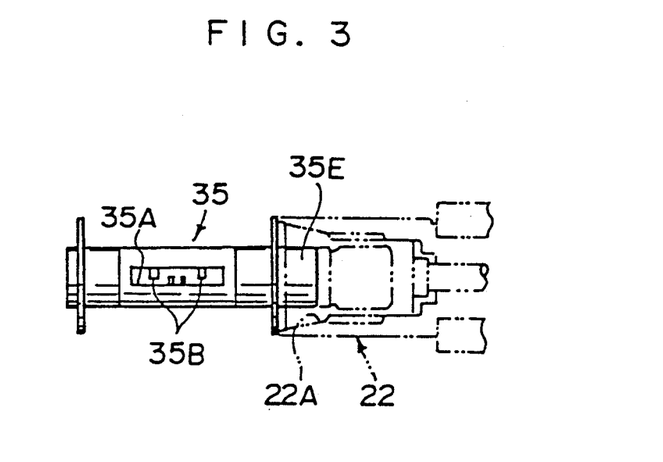
FIG. 3 is a plan view showing a part of the film winding pallet.

A plurality of film winding pallets 20 (20A, 20B, 20C . . . ) are slid along the guide rails 11 and 14 in the longitudinal direction thereof in engagement with the guide rails. Reference numerals 20A, 20B, 20C and so on will sometimes be used in order to denote the film winding pallets 20 per se which are positioned in particular positions and sometimes be used in order to denote the particular positions, hereinbelow. As shown in FIG. 2, the film winding pallet 20 has a carriage body 20a provided on the lower surface thereof with an engagement groove 21 which is adapted to be engaged with the guide rails 11 and 14 so that the carriage body 20a can slide along the rails. A bearing unit (not shown) is provided in the engagement groove 21 in order to facilitate the slide of the carriage body 20a along the rails 11 and 14. The film winding pallet 20 is provided with a spool holding shaft 22 which extends in parallel to the engagement groove 21. As shown in FIG. 3, the spool holding shaft 22 is provided with a collet chuck 22A on the front end thereof. The collet chuck 22A is given a work holding force by a coil spring 24, and the transmission of the work holding force to the chuck 22A is interrupted when a spool release lever 25 is depressed. The spool holding shaft 22 is connected, by way of a rotation transmission mechanism (not shown), to a rotation inputting shaft 23 which projects from a side of the carriage body 20a. The rotation inputting shaft 23 is provided with a claw clutch 23A on the outer end thereof. A pair of brake members 27 project outside from the side of the carriage body 20a and are urged outward by springs 26. Each brake member 27 is connected to a brake pad (not shown) and normally presses it against the spool holding shaft 22 so as to restrain the rotation of spool holding shaft 22. When pushed inward by an external force, the brake member 27 removes the brake pad from the spool holding shaft 22 and permits the spool holding shaft 22 to rotate freely. A pair of film pinch arms 29A and 29B are mounted on the top of the carriage body 20a so that they can rotate in a horizontal plane respectively about pivot shafts 28A and 28B. The film pinch arms 29A and 29B are moved between an open position shown in FIG. 2 where they are positioned away from each other and a closure position above and in front of the collet chuck 22A where they abut against each other. The arms 29A and 29B forms a toggle mechanism and held in the open position or the closure position under the force of a toggle spring 30. The arms 29A and 29B are positioned in one of the positions by operation of an arm opening and closing lever 31. A hook roller 32 which is used when the film winding pallet 20 is moved is provided in the vicinity of the arm opening and closing lever 31.

Figure 4:
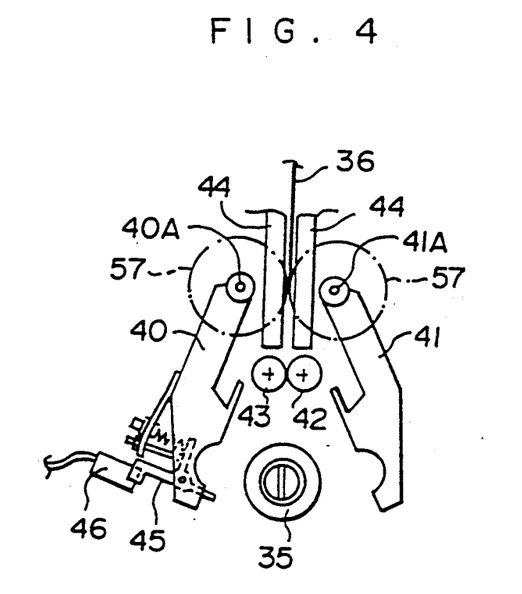
FIG. 4 is a side view showing the means for engaging a roll film with a spool in the system shown in FIG. 1.
Figure 5:
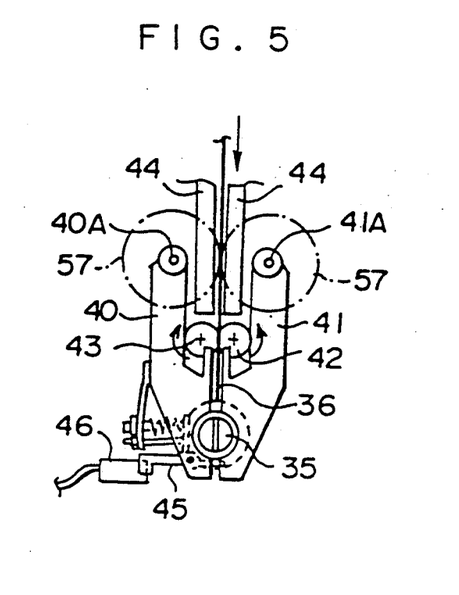
FIG. 5 is a view similar to FIG. 4 but showing a different state of the means for engaging a roll film with a spool.
Figures 6, 7, 9, 10:
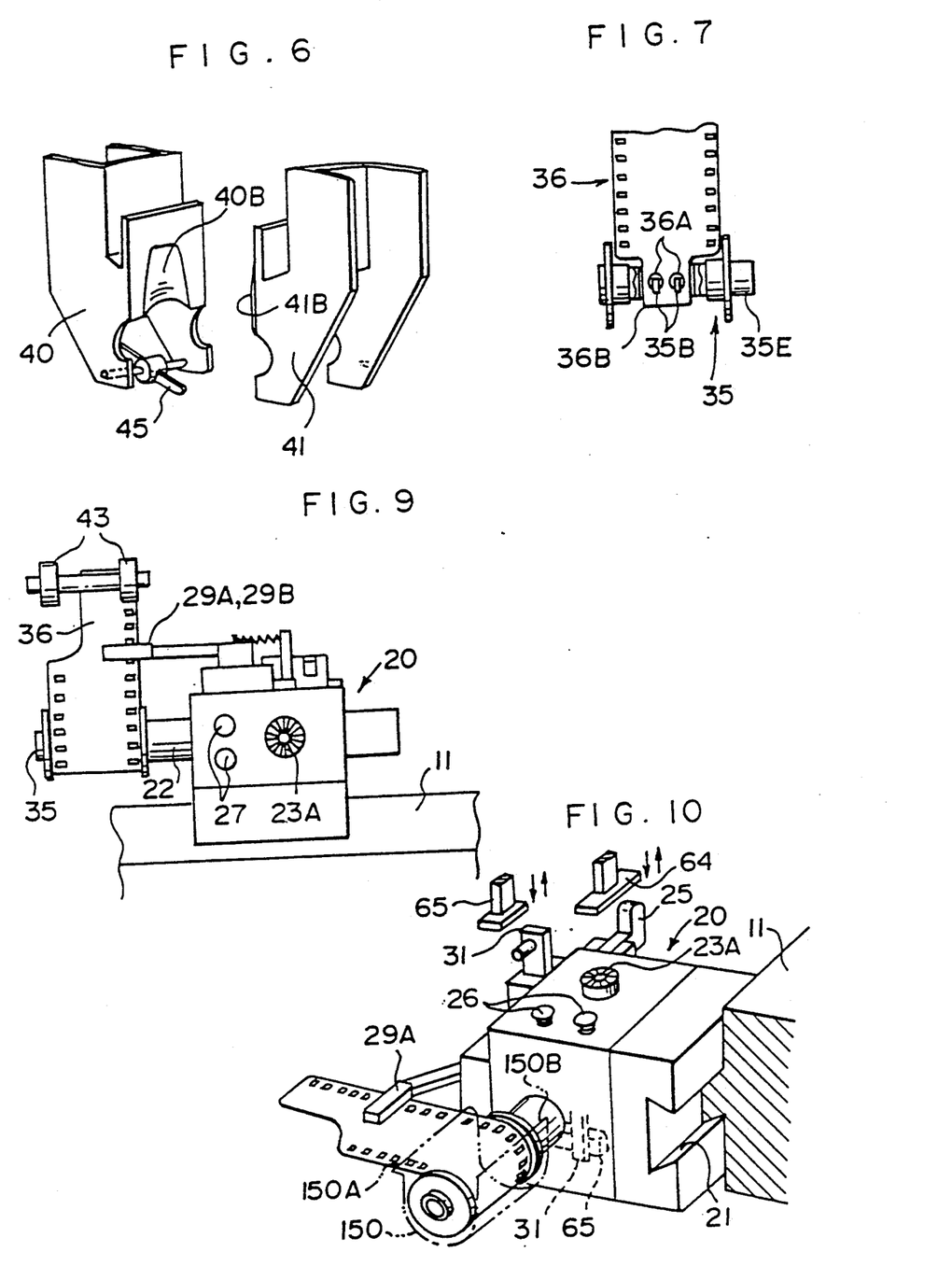
FIG. 6 is a perspective view showing a part of the means shown in FIGS. 4 and 5.
FIG. 7 is a side view partly cut away showing the engagement of the roll film with the spool.
FIG. 9 is a side view showing the state of the film winding pallet after completion of winding of the film roll.
FIG. 10 is a perspective view for illustrating how to load the roll film with the spool into the film magazine.

The film winding pallet 20 chucks the longer boss portion 35E of a spool 35 for 35 mm film (FIG. 3) with the collet chuck 22A in a manner which will be described later. When a roll film is wound around the spool 35, three film winding pallets 20 with the spools 35 chucked are positioned on the uppermost one of the guide rails 11 of the first indexing means 10 as shown in FIG. 1. At this time, the three film winding pallets 20 are spaced from each other by a predetermined distance and arranged in line so that the spool holding shafts 22 of the respective film winding pallets 20 are in alignment with each other in parallel to the rail 11. A roll film of a predetermined length is fed to each of the three spools 35 and an end of the roll film is brought into engagement with the spool 35. The operation of engaging the roll film with the spool 35 will be described, hereinbelow, with reference to FIGS. 4 to 6 which show in detail the mechanism for the purpose. The mechanism is omitted in FIG. 1. Three pairs of clampers 40 and 41 are disposed so that one pair of clampers 40 and 41 are disposed on opposite sides of each spool 35 held by the film winding pallet 20 as shown in FIG. 4. The clampers 40 and 41 are pivoted toward each other and clamp the spool 35 therebetween as shown in FIG. 5 when the film winding pallet 20 holding the spool 35 is positioned in a predetermined position. At this time, the spool 35 is held so that its cassette slit 35A (FIG. 3) opens upward. Then a roll film 36 which has been held above a pair of guide plates 44 with its trailing end portion 36B directed downward is dropped between the guide plates 44 and a pair of feed rollers 42 and 43 below the guide plates 44 are rotated as shown by the arrows in FIG. 5, whereby the trailing end portion 36B of the roll film 36 is inserted into the slit 35A of the spool 35. The trailing end portion 36B of the roll film 36 has been cut into the shape shown in FIG. 7 and is provided with a pair of engagement holes 36A. The spool 35 is provided with a pair of engagement claws 35B in the slit 35A. Each engagement claw 35B has an inclined surface and hooked tip portion, and the engagement holes 36A are brought into engagement with the engagement claws 35B as the trailing end portion 36B of the roll film 36 is inserted into the slit 35A as shown in FIG. 7. Thus the trailing end portion 36B is connected to the spool 35. In this state, the trailing end portion 36B partly projects downward from the lower opening of the slit 35A (e.g., by 1 mm). The projecting part of the trailing end portion 36B pushes downward a film insertion detecting lever 45 which is shown in FIGS. 4 and 5. The downward movement of the lever 45 is detected by a photoelectric sensor 46. When the sensor 46 detects the downward movement of the lever 45 and outputs a film insertion completion signal, the feed rollers 42 and 43 are stopped, and the clamper 40 and 41 are returned to the position shown in FIG. 4. As shown in FIG. 6, a convex surface 41B is formed on the inner side of the clamper 41 and a concave surface 40B conforming to the convex surface 41B is formed on the inner side of the clamper 40. Accordingly, the trailing end portion 36B of the roll film 36 is curved and stiffened when it is inserted into the slit 35A, which facilitates insertion of the roll film 36 into the slit 35A and prevents the roll film 36 from folding.

FIG. 8 shows winding driving means which rotates the spools 35 in order to wind the roll films 36 around the spools 35. The winding driving means is omitted in FIG. 1. After the feed rollers 42 and 43 are stopped, a table 50 is moved along a pair of guide rails 51 to the side of the first indexing means 10 as shown in FIG. 8. Three winding driving shafts 52 are located on the table 50. Each driving shaft 52 is connected to the output shaft of a servomotor 54 by way of a clutch-brake unit 53. Each driving shaft 52 has a claw clutch (not shown) on the free end face thereof and is opposed to the rotation inputting shaft 23 of one of the film winding pallets 20. When the table 50 is moved toward the first indexing means 10 by a predetermined distance, the claw clutch on the driving shaft 52 is brought into engagement with the claw clutch 23A on the rotation inputting shaft 23. At the same time, brake releasing members 59 push the brake members 27 of the respective film winding pallets 20 and release the spool holding shafts 22. Thereby, rotation of the servomotor 54 is transmitted to the spool holding shafts 22 and the spools 35 thereon are rotated, whereby the roll films 36 are wound around the spools 35. As described above, the roll films 36 are fed toward the spools 35 by the feed rollers 42 and 43. Each pair of feed rollers 42 and 43 are driven by a servomotor 56 by way of a clutch brake unit 55. When the three roll films 36 are wound around the respective spools 35 in the manner described above, and the leader portion of each roll film 36 is detected by a photoelectric sensor 58, the clutch-brake units 53 and 55 interrupt transmission of the rotation and brake the driven systems so that the leader portions of a predetermined length are kept unrolled.

While the leader portion of each roll film 36 is still held between the feed rollers 42 and 43, a pinch arm driving member 60 is moved in the direction parallel to the guide rails 11. The pinch arm driving member 60 has three abutment portions (not shown) which are adapted to abut against the arm opening and closing levers 31 of the respective film winding pallets 20, and when the pinch arm diving member 60 is moved in the direction parallel to the guide rails 11, each projection urges the corresponding arm opening and closing lever 31 to bring the film pinch arms 29A and 29B of the corresponding film winding pallet 20 to said closure position. As shown in FIG. 9, when the film pinch arms 29A and 29B are moved to the closure position, the leader portion of the roll film 36 is pinched therebetween. Thereafter the table 50 is moved away from the first indexing means 10 to a predetermined waiting position. This causes the brake releasing members 59 to move away from the brake members 27, and the brake pads are pressed against the respective spool holding shafts 22. Accordingly, each spool 35 is prevented from being reversed under the resiliency of the roll film 36 so as to unroll the roll film 36.

After the roll films 36 are wound around the spools 35 and the leader portions of the roll films 36 are pinched by the film pinch arms 29A and 29B, the first indexer driving means 12 rotates the first indexing means 10 by 90°. At this time the second indexing means 13 is also rotated by 90°. Accordingly, the three film winding pallets 20 which have been in the positions indicated at 20F, 20G and 20H in FIG. 1 are moved to the positions indicated at 20C, 20D and 20E. Another three film winding pallets 20 have been positioned on the guide rail 11 which is in the uppermost position after the first indexing means 10 is thus rotated by 90° in the manner which will become apparent later, and the roll films 36 are wound around the spools 35 held by the another three film winding pallets 20 in the manner described above.

A shifter 61 extends in parallel to the guide rails 11 and is opposed to the film winding pallets 20C to 20E. The shifter 61 comprises a guide rod 61a and three engagement members 62 which are slidable on the guide rod 61a and rotatable about the longitudinal axis of the guide rod 61a together with the guide rod 61a. The three engagement members 62 are spaced from each other by a distance equal to the distance between adjacent two film winding pallets 20. When three film winding pallets 20 are moved to the positions 20C to 20E, the guide rod 61a is rotated and the engagement members 62 are brought into engagement with the hook rollers 32 of the respective film winding pallets 20C to 20E. Thereafter, the engagement members 62 are moved along the guide rod 61a by a distance equal to the space between the film winding pallets and pushes the film winding pallets 20C to 20E toward the guide rails 14 of the second indexing means 13 so that the pallet which has been in the position 20C is delivered to one of the guide rails 14 as shown by the chained line in FIG. 1 and the pallets which have been respectively in the positions 20D and 20E are moved to the positions 20C and 20D. The engagement member 62 nearest to the guide rails 14 is further moved by a predetermined distance L after the other engagement members 62 are stopped and move the film winding pallet 20C to the position shown by the chained line.

A magazine assembly system 100 is disposed beside the guide rails 14. The magazine assembly system 100 comprises a vertical indexing system 102 which intermittently rotates about a shaft 101 in a vertical plane perpendicular to the longitudinal axis of the guide rails 14. The indexing system 102 holds a magazine barrel plate 150 in an unrolled state in a position opposed to the film winding pallet 20 delivered to the guide rail 14 as shown in FIG. 10. When the film winding pallet 20 is moved to the position shown by the chained line, the spool 36 with the roll film 35 held by the film winding pallet 20 is moved in the longitudinal direction thereof above the magazine barrel plate 150, and the magazine barrel plate 150 is rolled so that opposite end portions 150A and 150B thereof are superposed one on the other and form the cassette slit. Thereafter, the engagement member 62 nearest to the guide rails 14 is returned by said predetermined distance L trailing the film winding pallet 20C on the guide rail 14. The film winding pallet 20C is still on the guide rail even after it is reversed by the distance L. At this time, the other two engagement members 62 are kept stationary. Before the engagement member 62 is returned, a spool releasing member 64 and a film releasing member 65 (FIG. 10) have been positioned in positions where they respectively interfere with the spool release lever 25 and the arm opening and closing lever 31. Accordingly, the releasing members 64 and 65 abut against the spool release lever 25 and the arm opening and closing lever 31 when the film winding pallet 20C is reversed, thereby causing the collet chuck 22A to release the spool 35 and moving the film pinch arms 29A and 29B to the open position so as to release the leader portion of the roll film 36. After the engagement member 62 nearest to the guide rails 14 is returned by the distance L and the three engagement members 62 are positioned in equal intervals, the guide rod 61a is rotated so as to release the engagement members 62 from the hook rollers 32 and then is returned to the original position.

The magazine barrel plate 150 which has been rolled about the spool 35 with the roll film 36 is fed in sequence to a capping step, a caulking step and the like by the indexing system 102. Predetermined time T2 after the second indexing means 13 is rotated by 90° together with the first indexing means 10, the second indexing means 13 is further rotated by 90°, whereby the pallet which has delivered the spool 35 with the roll film 36 to the indexing system 102 is moved to the position 20B. The pallet is fed with another spool 35 and chucks it. When the pallet chucks another spool, the spool release lever 25 is pushed and the collet chuck 22A is opened, and the longer boss portion 35E of the spool 35 is inserted into the chuck 22A. Thereafter, the spool release lever 25 is released and the collet chuck 22A i permitted to close. The spool 35 has been provided with a locator groove (not shown) on the outer peripheral surface thereof, and when the spool 35 is to be chucked by the collet chuck 22A, the spool 35 is revolved about its longitudinal axis until the locator groove is engaged with a probe claw (not shown). In this manner, the spool 35 can be correctly oriented with respect to the collet chuck 22A so that when the pallet is brought to the position 20F, 20G or 20H shown in FIG. 1, the slit 35A opens upward with the engagement claws 35B directed downward so as to permit insertion of the roll film 36 into the slit 35A and engagement of the engagement holes 36A of the roll film 36 with the engagement claws 35B. When the spool 35 is oriented in this manner prior to the film winding step described above, the film winding step can be performed in a short time with high reliability.

While the pallet is fed with another spool 35 in the manner described above, the next pallet 20D is moved to one of the guide rails 14 and then the spool with the film carried by the pallet 20D is loaded in a magazine barrel.

Thereafter, the second indexing means 13 is rotated by 90° and the pallet provided with another spool 35 is brought to the position 20A. The pallet in the position 20A is returned to the guide rail 11 of the first indexing means 10 by a pallet return shifter 66. The pallet return shifter 66 is similar to the shifter 61 and comprises a guide rod 66a and three engagement members 67 which are slidable on the guide rod 66a and rotatable about the longitudinal axis of the guide rod 66a together with the guide rod 66a. The engagement 67 nearest to the second indexing means 13 engages with the hook roller 32 of the pallet in the position 20A and slides along the guide rod 66a by a predetermined distance, thereby, moving the pallet to one of the guide rails 11 of the first indexing means 10. While the pallet in the position 20A is thus moved to the first indexing means 10, another spool 35 is fed to the pallet which has delivered the spool 35 with the roll film 36 to the indexing system 102 and the spool 35 with the roll film 36 is delivered to the indexing system 102 from the pallet which has been moved to the second indexing means 13.

Since the first indexing means 10 is rotated once every time the second indexing means 13 is rotated three times, all the three pallets the spools 35 on which were provided with the roll films 36 at one time are thus returned to the first indexing means 10 each carrying thereon another spool by the time th second indexing means 13 and the first indexing means 10 make another simultaneous rotation. At the same time, winding of the roll films 36 around the spools 35 on another three pallets in the positions 20F, 20G and 20H is completed by the time. Then, when the first indexing means 10 is subsequently rotated by 90°, the three pallets are positioned in the positions 20F, 20G and 20H at one time. Then the operations described above are repeated.

As can be understood from the description above, in this embodiment, the operations of delivering the pallet 20 carrying thereon the spool 35 with the roll film 36 to the second indexing means 13, loading the spool 35 with the roll film 36 into the film magazine, feeding the pallet 20 with another spool 35, and returning the pallet 20 with another spool to the first indexing means 10 are performed while the roll films 36 are wound around the three spools 35, which are performed at one time.

In the embodiment described above, three spools are provided with the roll films at one time, and while the three spools are provided with the roll films, the spools which have been provided with the roll films in the preceding film winding operation are loaded into the film magazines, another three spools are fed to the pallets from which the spools with the roll film have been removed and the pallets with another spool are returned. However, one, two or more than three spools ma be provided with the roll films at one time. Further, the system in accordance with the present invention may be arranged so that the operations described above are all performed in series. That is, the system may be arranged so that after the roll films 36 are wound around the spools 35, all the spools 35 are simultaneously sent to the next step, that is, all the spools are loaded into the film magazines at one time by the same number of indexing systems. In this case, though the time required to wind the roll film around the spool is too long as compared with the times required to perform other steps, the operation of exchanging the spools carrying thereon the roll films between two spool holding means such as pickup arms can be avoided. Further, the number of spools subjected to each step may be one.

Further, though, in the embodiment described above, the operation of feeding the film winding pallet 20 with another spool 35 and the operation of returning the pallet to the first indexing means 10 are performed in different positions, the latter operation may be performed immediately after the former operation is completed if these operations can be performed in a very short time as compared with the operation of winding the roll film around the spool. Further, the trailing end of the roll film may be fixed to the spool by use of adhesive tape or the like instead of the engagement claws 35B.

We claim:
1. A film winding pallet comprising a spool holding shaft which holds a spool and rotates the spool about its longitudinal axis under a force transmitted thereto from outside the film winding pallet, a film pinch means which opens and closes under a force transmitted thereto from outside the film winding pallet and pinches a leader portion of a roll film wound around the spool when said film pinch means closes, a brake means which brakes and releases the spool holding shaft, and an engagement means for holding said film winding pallet on an external guide member, and which is adapted to be slidably engaged with said external guide member along said external guide member in a direction parallel to the spool holding shaft.

2. A film winding pallet according to claim 1, wherein said engagement means comprises a groove integrally formed with said film winding pallet.

* * * * *